(12) United States Patent
Pitney

(10) Patent No.: US 9,534,735 B2
(45) Date of Patent: Jan. 3, 2017

(54) PRESSURE-LOCKING NOZZLE FOR DISPENSING GASEOUS FLUID

(71) Applicant: Paul T. Pitney, Wildwood, MO (US)

(72) Inventor: Paul T. Pitney, Wildwood, MO (US)

(73) Assignee: Husky Corporation, Pacific, MO (US)

( * ) Notice: Subject to any disclaimer, the term of this patent is extended or adjusted under 35 U.S.C. 154(b) by 517 days.

(21) Appl. No.: 13/694,339

(22) Filed: Nov. 23, 2012

(65) Prior Publication Data

US 2013/0327439 A1    Dec. 12, 2013

Related U.S. Application Data

(60) Provisional application No. 61/629,664, filed on Nov. 23, 2011.

(51) Int. Cl.
*F17C 5/06* (2006.01)
*F16L 37/084* (2006.01)

(52) U.S. Cl.
CPC ............ *F17C 5/06* (2013.01); *F16L 37/0848* (2013.01)

(58) Field of Classification Search
CPC ....... F17C 5/06; F17C 2205/037; F16L 37/44; F16L 37/144; F16L 37/0848; F16L 37/0847; F16L 19/00
USPC ............. 141/346, 383, 385; 251/149, 149.6; 285/322–324; 137/614.05
See application file for complete search history.

(56) References Cited

U.S. PATENT DOCUMENTS 2,789,838 A    4/1957  Palm
2,877,437 A    3/1959  Flanagan
3,039,794 A    6/1962  DeCenzo
3,234,965 A    2/1966  Anderson
3,601,361 A *  8/1971  Hundhausen et al. ..... 251/149.1
(Continued)

*Primary Examiner* — Mark A Laurenzi
*Assistant Examiner* — Andrew Stclair
(74) *Attorney, Agent, or Firm* — Paul M. Denk

(57) ABSTRACT

A high pressure dispensing nozzle for providing fuel from an inlet reserve to a connector of an outlet receptacle, including a generally tubular nozzle construction having an outer sleeve extending from adjacent a proximal end towards a distal end of the nozzle construction, an internal passageway construction disposed within the outer sleeve, and a plurality of radially movable jaw members disposed between the internal passageway construction and the outer sleeve extending to near the distal end of the tubular construction, wherein the internal passageway construction includes interacting components responsive to insertion of the connector into the distal end and engagement thereof with the internal passageway construction to effect movement of the jaws to lock the connector in engagement and to establish a fuel passageway through the nozzle construction for the delivery of fuel therethrough and wherein the internal passageway construction components include a pistonably slideable outlet tube construction that not only serves as part of the fuel delivery passageway through the nozzle construction but also both as a control for locking the jaws and the outer sleeve in a fueling configuration and as a valve construction for allowing and preventing fuel flow through the nozzle construction. The nozzle preferably is also responsive to the introduction of fuel thereinto to pressure lock the outer sleeve in a fueling configuration and additionally operates to prevent the dispensing of fuel in the event that a proper and correct connector is not locked into engagement for fuel dispensing.

3 Claims, 9 Drawing Sheets

(56) References Cited

U.S. PATENT DOCUMENTS

| | | |
|---|---|---|
| 4,036,515 A | 7/1977 | Karcher et al. |
| 4,403,959 A | 9/1983 | Hatakeyama |
| 4,493,475 A * | 1/1985 | Baird .................. 251/149.1 |
| 4,637,432 A | 1/1987 | Medvick et al. |
| 4,671,540 A | 6/1987 | Medvick et al. |
| 4,685,490 A | 8/1987 | Medvick et al. |
| 4,889,527 A | 12/1989 | Herrli |
| 4,899,792 A * | 2/1990 | Podgers .............. F16L 27/047 137/68.14 |
| 5,095,947 A * | 3/1992 | Weh .................. F16L 37/121 137/614.06 |
| 5,323,812 A | 6/1994 | Wayne |
| 5,540,259 A | 7/1996 | Keck |
| 5,630,570 A | 5/1997 | Lacroix et al. |
| 5,730,185 A | 3/1998 | Wilkins et al. |
| 6,035,894 A | 3/2000 | Weh et al. |
| 6,257,285 B1 | 7/2001 | Robinson et al. |
| 6,343,630 B1 * | 2/2002 | Dubinsky .................. 141/385 |
| 6,375,152 B1 * | 4/2002 | Weh et al. .................. 251/149.6 |
| 6,715,801 B2 * | 4/2004 | Zhadanov .................. 285/316 |
| 6,840,548 B2 | 1/2005 | Lacroix |
| 7,048,020 B2 | 5/2006 | Durieux et al. |
| 7,073,773 B2 * | 7/2006 | Nuttall et al. .............. 251/149.6 |
| 7,458,400 B2 * | 12/2008 | Weh et al. .................... 141/94 |
| 7,494,158 B2 * | 2/2009 | Weh et al. .................... 285/322 |
| 7,588,059 B2 * | 9/2009 | Robinson et al. ............. 141/65 |
| 7,766,393 B2 | 8/2010 | Tiberghien et al. |
| 7,793,914 B2 * | 9/2010 | Danielson .................. 251/149.9 |
| 7,883,117 B2 | 2/2011 | Marc et al. |
| 8,851,115 B2 * | 10/2014 | Kanno et al. ............. 137/614.04 |
| 2005/0212289 A1 * | 9/2005 | Weh et al. .................... 285/308 |
| 2007/0277905 A1 | 12/2007 | Weh et al. |
| 2008/0223486 A1 | 9/2008 | Weh et al. |
| 2009/0167019 A1 | 7/2009 | Weh et al. |

* cited by examiner

PRESSURE-LOCKING NOZZLE FOR DISPENSING GASEOUS FLUID

CROSS REFERENCE TO RELATED APPLICATION

This non-provisional patent application claims priority to patent application having Ser. No. 61/629,664, filed on Nov. 23, 2011.

FIELD OF THE INVENTION

This invention relates to a high pressure filling nozzle for dispensing gaseous fluids from an inlet reserve to an outlet receptacle, and, in particular, to a pressure-locking nozzle that provides a sealed connection from the inlet reserve to a connector of the outlet receptacle for filling the receptacle.

BACKGROUND OF THE INVENTION

Recent years have experienced a growing desire for natural gas-powered vehicles (NGV) and advances in the design and provision of such types of vehicles. Effective use of such types of vehicles, however, requires means to safely and reliably fuel and refill fuel tanks of such vehicles as they are utilized.

Such need has resulted in the development of various standards for such means, including the standards for Type 2 and 3 nozzles as set forth in ANSI/CSA NGV1-2006 Standard for Compressed Natural Gas Vehicle (NGV) Fueling Connection Devices. That standard addresses design profiles for such fueling connection devices, as well as the standardized forces associated with connection (or coupling) and disconnection (or uncoupling) of a nozzle from a receptacle at the low and high pressures encountered during fueling processes.

The result has been a continuing and ongoing desire for new and improved fuel nozzles that can comply with such standards and can be employed to safely and reliably fuel and refill fuel tanks of NGV vehicles.

SUMMARY OF THE INVENTION

The present invention has been developed to address and satisfy such desire, and provides a pressure-locking nozzle for dispensing gaseous fluids under high pressure, such as compressed natural gas (CNG). A preferred embodiment of such pressure-locking nozzle, of a generally tubular construction, has been designed to dispense a gaseous fluid therethrough from an inlet reserve to a connector of an outlet receptacle, and includes various features for effecting such dispensing in accordance with the applicable NGV1 standards.

In such regard, the preferred generally tubular nozzle construction is designed to have opposed first, proximal, and second, distal, ends and an internal fluid passageway construction extending generally between the first and second ends, with a generally central, valved, passageway formed therethrough for conveying the gaseous fluid from the inlet reserve to the connector of the outlet receptacle for dispensing into the outlet receptacle when the tubular construction is properly connected to both the inlet reserve and the outlet receptacle for fueling. Such internal passageway construction includes interacting components for controllably opening and closing a central passageway through such internal passageway construction to permit conveyance of the fluid therethrough when the connector of the outlet receptacle is in proper engagement with the internal fluid passageway construction and an external valve, such as a ball valve, is operated to introduce fuel from the inlet reserve to the nozzle construction.

In addition, such tubular nozzle construction includes a plurality of clamping members operable to clamp the connector of the outlet receptacle in contact with the internal fluid passageway construction and a slideably movable outer sleeve construction surrounding the internal fluid passageway construction and the plurality of clamping members. The internal passageway construction includes cooperatively engageable portions and elements that are operatively responsive to positioning of the connector of the outlet receptacle in a mating engagement with the internal fluid passageway construction to effect movement of the outer sleeve construction into a dispensing or fueling configuration that maintains the clamping engagement of the clamping members with the connector of the outlet receptacle in a locking engagement.

Such preferred nozzle construction employs a unique design that includes a fuel delivery outlet tube as part of the internal construction of the nozzle. Such fuel delivery outlet tube, which is hereinafter often referred to more simply as an outlet tube, is so configured that it can act not only as a fluid carrying tube for the delivery of the fuel but also both as a control to maintain the mating engagement between the clamping members and the connector of the outlet receptacle and as a valve to permit and effect establishment of a delivery passageway through the nozzle for providing fuel from the inlet reserve to the connector of the outlet receptacle.

Such preferred construction, unlike certain prior art nozzles, therefore does not require a separate valve member or element in addition to a tube that includes a mating control assembly or element therewith, but, instead, incorporates both the mating control and valve functions into a single slideably movable interior fuel delivery tube that includes a capped proximal end, an open distal, or dispensing, end, an annular outlet ring near its distal end that rides against the clamping members, and one or more side wall apertures in the tube located near the capped proximal end of such interior fuel delivery tube. As such inner tube moves pistonably within the nozzle, it acts to not only control the positions of the clamping members that are riding against the annular outlet ring but also to expose or close the apertures in the side wall to permit or prevent fuel flow therethrough, thus serving as a valve.

In addition, such preferred construction includes various other features, such as a pressure locking feature, that improve safety and alleviate problems encountered with certain prior art nozzles.

In such regards, after the outer sleeve construction has been moved to a dispensing or fueling configuration, a pressure responsive mechanism of the internal passageway construction is operable as actual fueling commences to effect pressurized engagement of such outer sleeve construction in such fueling configuration to establish a pressure-locked engagement and to inhibit or prevent movement of said outer sleeve construction out of such configuration during conveyance of the fluid through the internal fluid passageway. Dispensing of the pressurized fuel may then proceed until the outlet receptacle is filled to a desired level.

Typically, uncoupling of the tubular construction between the inlet reserve and the outlet receptacle upon completion of a fueling operation involves the reverse slideable movement of the outer sleeve construction from its dispensing or fueling configuration back to a home position following release of pressurization due to operation of an external pressure valve.

The invention operates in compliance with the applicable NGV1 standard noted hereinabove, which dictates that the fuel nozzle must be able to couple when internal pressure is low, and to resist uncoupling, or to require high uncoupling force, when internal pressure is high. The invention makes use of the internal pressure to provide the appropriate high or low resistance to coupling or uncoupling of the nozzle.

As clamping members, the invention preferably employs a plurality of jaws to lock on to the inserted connector of the outlet receptacle and to hold the connector in place. Such jaws, which are generally, disposed radially extending as fingers along the interior of the outer sleeve construction adjacent to the outer end of the internal fluid passageway construction, operate to become trapped in a locked, mating engagement, position by means of the sliding outer sleeve construction.

The initial clamping operation results from the interaction of various portions or components of the nozzle, and particularly components of, or associated with, the internal fluid passageway construction, the outlet tube of which, as previously noted, is pistonably slideable into the fuel chamber of the fuel conveyance cylinder to also function as a valve construction along the internal passageway. Such outlet tube has an annular outlet ring construction disposed near the distal end of the tube, which outlet ring rides against the adjacent jaw fingers to control the positionings thereof.

Initially, the outer sleeve is disposed generally rearwardly, or towards the proximal end of the nozzle, as part of the tubular nozzle construction, and is prevented from being moved forwardly, or towards the distal end of the nozzle, by various interacting components of the internal passageway construction, including restrictions associated with the jaw fingers. When the connector of the outlet receptacle is inserted into the distal end of the nozzle to force the connector into intimate engagement with the inwardly-tapered distal end of the outlet tube, such action causes the outlet tube to be forced rearwardly, against the spring loading being exerted on the outlet tube, along the interior of an outer collar and into the distal end of the central fuel conveyance cylinder, the proximal end of which central fuel cylinder is operatively connected to the first end of the internal passageway construction.

As a consequence of such movement of the outlet tube, the annular outlet ring construction thereon is also moved rearwardly along the interior surfaces of the jaw fingers, towards the proximal ends thereof, to seat within stepped recesses on such interior surfaces, thereby allowing the distal ends of the jaws to move radially inwardly to engage the connector of the outlet receptacle as the proximal ends of the jaws move radially outwardly to relieve restrictions that had been preventing forwardly movement of the outer sleeve. The outer sleeve construction is spring-loaded in such a way that, when such restrictions against forward movement are relieved, the outer sleeve construction is caused to move forwardly, towards the distal end of the nozzle construction and the engaged connector of the outlet receptacle.

Such forward movement of the outer sleeve construction to a dispensing or fueling configuration effectively serves to maintain the jaws in a condition locking the connector of the outlet receptacle in mating engagement with the inwardly-tapered distal end of the outlet tube so long as the outer sleeve construction remains in such dispensing or fueling configuration. Such clamping and locking operations typically occur prior to commencement of the actual fueling, when the pressure within the passageway is still low.

During the actual fueling event, when high internal pressure becomes present due to the introduction of the pressurized fluid from the inlet reserve into the central fuel conveyance cylinder of the internal fluid passageway construction, the pressurized fluid in the nozzle is allowed to also fill an outer chamber outside the main flow path within the internal fluid passageway construction. The resulting pressure in such outer chamber forces an internal sleeve of the internal fluid passageway construction forwardly against an inwardly projecting annular wall on the interior of the outer sleeve construction to maintain the outer sleeve construction in its dispensing or fueling configuration. Since uncoupling the nozzle requires the user to pull the outer sleeve construction rearwardly, away from the outlet receptacle, and since the outer sleeve is then being held in place by the high pressure on the inner sleeve, an excessive rearward force, larger than the minimum required by the NGV1 standard under high pressure conditions, would need to be applied on the outer sleeve construction in order to uncouple the nozzle. Such pressure locking feature of the invention provides the high pressure safety feature dictated by the NGV1 standard.

When fueling is complete, the accepted practice is to vent the gas into the atmosphere, or in some cases back into the compression system, through a separate hose. An external valve, not part of the present nozzle construction, is turned to a "vent" setting which allows the gas to flow, or drain, out of the nozzle assembly. As the nozzle assembly is depressurized, the noted outer chamber of the internal fluid passageway construction also returns to atmospheric pressure, as a consequence of which the inner sleeve is no longer held in its forward position and can then be readily moved rearwardly, against spring biasing, by a user. When the user pulls the outer sleeve construction rearwardly, the jaws are released from their locked condition and the nozzle may be uncoupled from the connector of the outlet receptacle.

The invention is also designed to obviate a safety problem that could potentially allow for the accidental or inadvertent discharge of pressurized fluid from the nozzle at times when the nozzle is not properly mated to the connector of an outlet receptacle. Such problem could arise if and when an improper or inadequate engagement between the nozzle and the connector of the outlet receptacle has been effected at or by the time fueling is initiated. The possibility has existed for the operator, before the nozzle was pressurized, to open an outlet valve to permit the free flow of fuel through the nozzle for fuel delivery and to thereafter pressurize the nozzle for fueling and effect fuel flow through the nozzle even if there was then no suitable engagement between the nozzle and the connector of the outlet receptacle. In such circumstances, the fluid could, inappropriately, and dangerously, and then be conveyed, under high pressure, through and out of the nozzle into the surrounding environment instead of into an outlet receptacle.

To address such concern, in the present invention, when pressurized fuel is introduced into the nozzle, the outlet tube of the internal passageway construction is automatically closed to seal off the escape or delivery of high pressure gas if there is no suitable engagement between the nozzle and the connector of the outlet receptacle, even if internal mechanisms may have previously been activated to lock the jaw members of the nozzle construction in a fueling configuration. The present invention is able to effect such result and prevent the problem described hereinabove due to the novel design and operation of the spring-loaded outlet tube, which, as previously addressed, additionally functions not only as a valve construction but also, with the associated outlet ring construction disposed on the outlet tube that rides against the fingers of the jaw members, as a control for locking the jaw members in a fueling configuration.

In proper operation, when the connector of an outlet receptacle is forced into intimate engagement with the inwardly-tapered distal end of the spring-loaded outlet tube, the outlet tube construction, which is capped at its inlet end and has a side wall aperture along its length near such capped end, is forced rearwardly, or towards the proximal end of the nozzle, into the fuel chamber of the central fuel conveyance cylinder of the internal passageway construction, against the spring loading, as the jaws operate to clamp onto the connector of the outlet receptacle, as has previously been explained hereinabove.

As the outlet tube thus moves rearwardly, the side wall aperture therein is moved clear of the outer collar and into the fuel chamber to establish a free passageway with free communication from the inlet reserve into the central fuel conveyance cylinder and through such side aperture and the outlet tube towards the engaged connector of the outlet receptacle. When pressure is thereafter introduced into the nozzle as the pressurized fluid is conveyed into and through the fluid passageway, the locked presence of the connector in mated engagement with the inwardly-tapered distal end of the outlet tube maintains the application of sufficient rearward force against such annular outlet ring construction to overcome the combination of the spring biasing of the outlet tube towards the nozzle outlet and the action of the pressure against the capped inlet end of the outlet tube.

On the other hand, if an improper object is inserted into the nozzle, or the connector of the outlet receptacle is inserted into the nozzle in such a way that it is not properly and adequately forced into intimate engagement with the inwardly-tapered distal end of the outlet tube, the outlet tube may nevertheless be pushed inwardly and rearwardly into the body of the nozzle even though no proper and adequate engagement has been established by an appropriate connector of an outlet receptacle with the outlet tube. While such movement of the outlet tube and the annular outlet ring will still cause the jaws to clamp radially inwardly, and the outer sleeve construction will move forwardly, or towards the distal end of the nozzle, to lock the jaws in such position as though an appropriate connector of the inlet receptacle were actually present and properly and adequately engaged, the jaws will not actually interact with any connector to lock and maintain the outlet tube in a fueling configuration because no appropriate connector is present.

Consequently, if pressure is thereafter introduced into such nozzle, because no connector is locked in place to apply a rearward pressure against the outlet tube, the combination of the introduced forward pressure acting upon the capped inlet end of the outlet tube and the spring loading upon such outlet tube will push the outlet tube forwardly, or towards the distal end of the nozzle, to move the side wall aperture into and along the interior of the outlet collar, thereby preventing any flow of fluid from the inlet reserve though such side wall aperture and through the outlet tube, even though the jaws and the outer sleeve construction had previously been moved to their coupled, or fueling configuration, positions. Such operation prevents the rapid, and dangerous, escape of pressurized gas from the nozzle. Return of the nozzle to the uncoupled orientation is accomplished by simply venting the pressure via the external ball valve and pulling rearward on the outer sleeve.

Consequently, the present invention provides a new and improved pressure-locking nozzle for dispensing gaseous fluids that complies with NGV standards and permits the safe and reliable fueling of vehicles with fuels such as CNG.

DESCRIPTION OF THE PREFERRED EMBODIMENT

Figure 1:
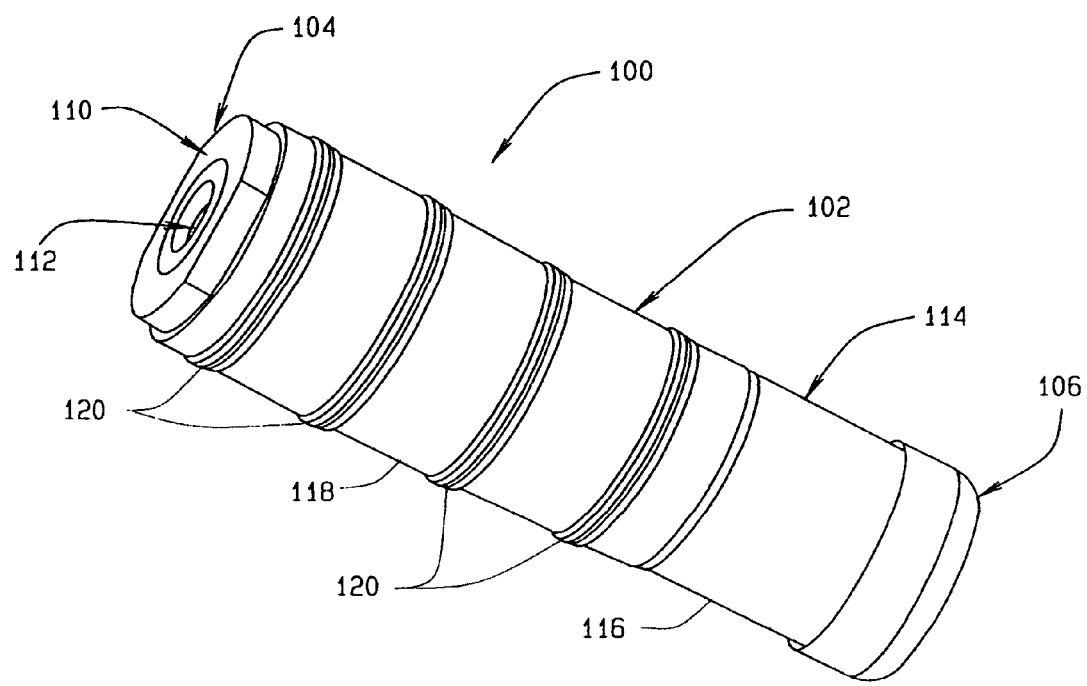
FIG. 1 is a perspective view of a preferred embodiment of a nozzle construction according to the present invention.
Figure 2:
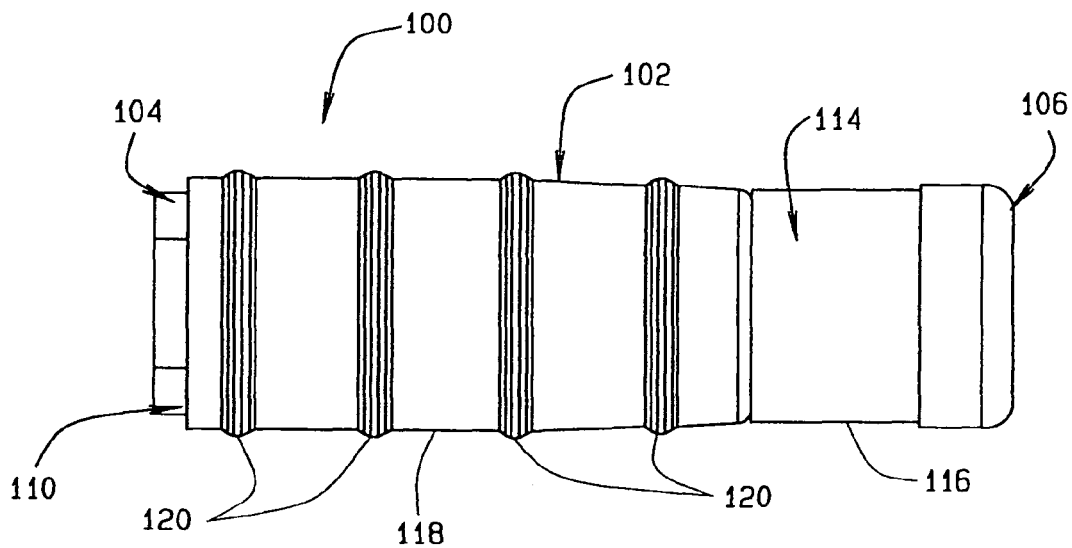
FIG. 2 is a side view of the embodiment of FIG. 1.
Figure 3:
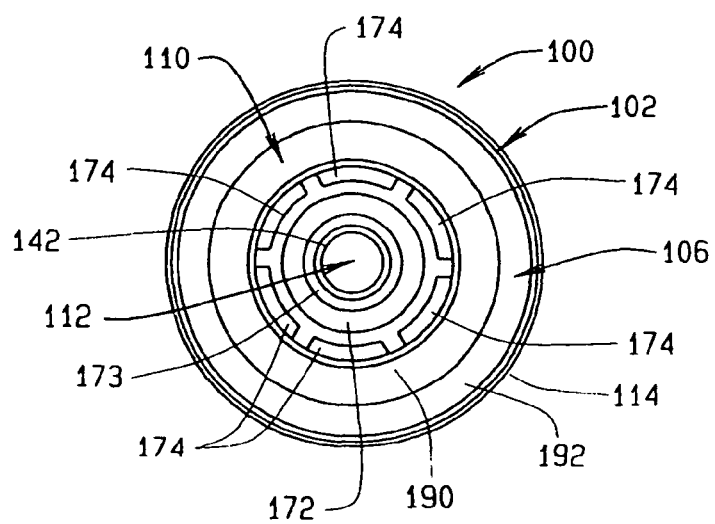
FIG. 3 is an outlet end view of such embodiment, with the embodiment canted slightly downwardly towards the outlet end.

With reference now to the drawings, wherein like numbers correspond to and identify generally like components, one preferred nozzle embodiment 100 according to present invention, as depicted in FIGS. 1-3, is in the form of a generally tubular nozzle construction 102 that has a first, proximal, inlet end 104, designed and configured to be engaged to an inlet reserve, and a second, distal, outlet end 106 designed and configured to receive therein the connector 108 (FIG. 5) of an outlet receptacle. Such tubular nozzle construction 102 includes an internal passageway construction 110 with a generally central passageway 112 therethrough and an outer sleeve construction 114 that includes a forwardly disposed jaw lock sleeve portion 116 connected to a rearwardly disposed grip sleeve portion 118 having a plurality of externally projecting radial ribs 120a that provide grip assistance.

Figure 4:
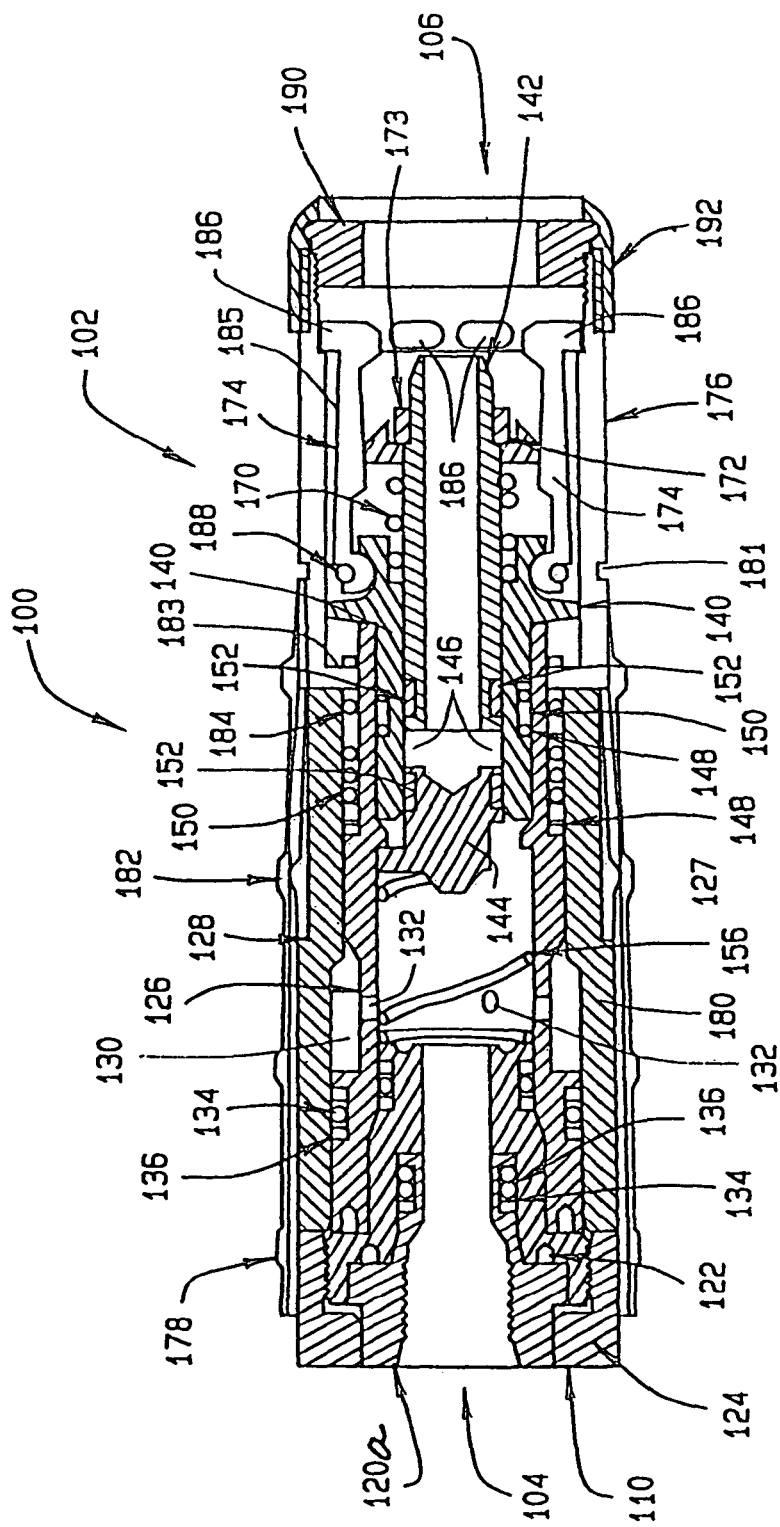
FIG. 4 is a side view of such embodiment, generally similar to FIG. 2, but in cross-section to better illustrates several of the internal components of the embodiment.

As better observed from FIG. 4, in such preferred embodiment 100 the internal passageway construction 110 includes at proximal end 104 of the tubular nozzle construction 102 an inlet fitting 120 that is engaged with an inlet cap 122 and a nut 124 to hold inlet fitting 120 in position with fuel conveyance cylinder 126 to provide fuel into the fuel chamber 127 when inlet fitting 120 is connected to an inlet reserve. Fuel conveyance cylinder 126 is fitted within inner jaw lock cylinder 128, and an outer pressure chamber 130 is formed along a portion of fuel conveyance cylinder 126 between the outer wall of fuel conveyance cylinder 126 and inner jaw lock cylinder 128, with one or more apertures 132 in the side wall of fuel conveyance cylinder 126 permitting fuel flow between the fuel chamber 127 of fuel conveyance cylinder 126 and outer pressure chamber 130. Various O-rings and back-up O-rings such as 134 and 136 are utilized to prevent leakage between adjacent components.

An elongated outlet collar 140 is screwed into the distal end of the fuel conveyance cylinder 126 and acts to slideably contain within its inner bore the outlet tube 142, which has a capped proximal end 144 extending into the fuel chamber 127 within fuel conveyance cylinder 126 and an open, inwardly-tapered distal end that extends to near distal end 106 within the tubular nozzle construction 102. Such outlet tube 142 includes one or more side wall apertures 146 near the capped proximal end 144, the purposes and effect of which will be further explained hereinafter. Various O-rings and back-up O-rings 148, 150, and 152 are utilized to prevent leakage between adjacent components. Central spring 156 within fuel conveyance cylinder 126 normally biases outlet tube 142 forwardly towards distal end 106 of the tubular construction 102 by exerting pressure against capped proximal end 144 of outlet tube 142.

A biasing spring 170 is disposed about the outer wall of outlet tube 142 to act against the annular outlet ring 172 shown positioned against end cap 173 on outlet tube 142 near the distal end of outlet tube 142 to normally bias annular outlet ring 172 against end cap 173 and outlet tube 142 towards distal end 106 of the tubular construction 102. Such annular outlet ring 172 bears annularly radially outwardly against the interior sides of a plurality of jaws 174 that are disposed extending along the inner sides of jaw lock cylinder 176. Jaw lock cylinder 176, with connected grip portion 178, annularly surrounds inner sleeve 180 and is attached near 181 to jaw lock cylinder 176 to form therewith a slideable outer sleeve 182.

The interiorly extending step 183 at the proximal or rear end of jaw lock cylinder 176 normally abuts the distal end of inner sleeve 180, and such components are held in their rearmost positions, against the force of spring 184, due to the design and positions of the plurality of jaws 174, each of which are in the form of fingers 185 that include step portions 186 at their distal or outer ends that serve to lock the jaw lock cylinder 176, and hence the outer sleeve 182, in place against forward movement. A spring 188 about the proximal or inner ends of such jaws 174 helps maintain the jaws 174 in an annular arrangement about the distal end of outlet tube 142.

An endpiece 190 is installed at the distal end 106 of the tubular construction 102 to help contain internal components within such construction and as a guide and size restriction element to help ensure that the connectors 108 of outlet receptacles inserted into the distal end 106 of the tubular construction are appropriately sized and so inserted to correctly mate with the tubular nozzle construction 102 for the fueling operation. A protective bumper 192 is provided with such endpiece 190 to engage and protect the distal or outer end of the jaw cylinder 176.

Figure 5:
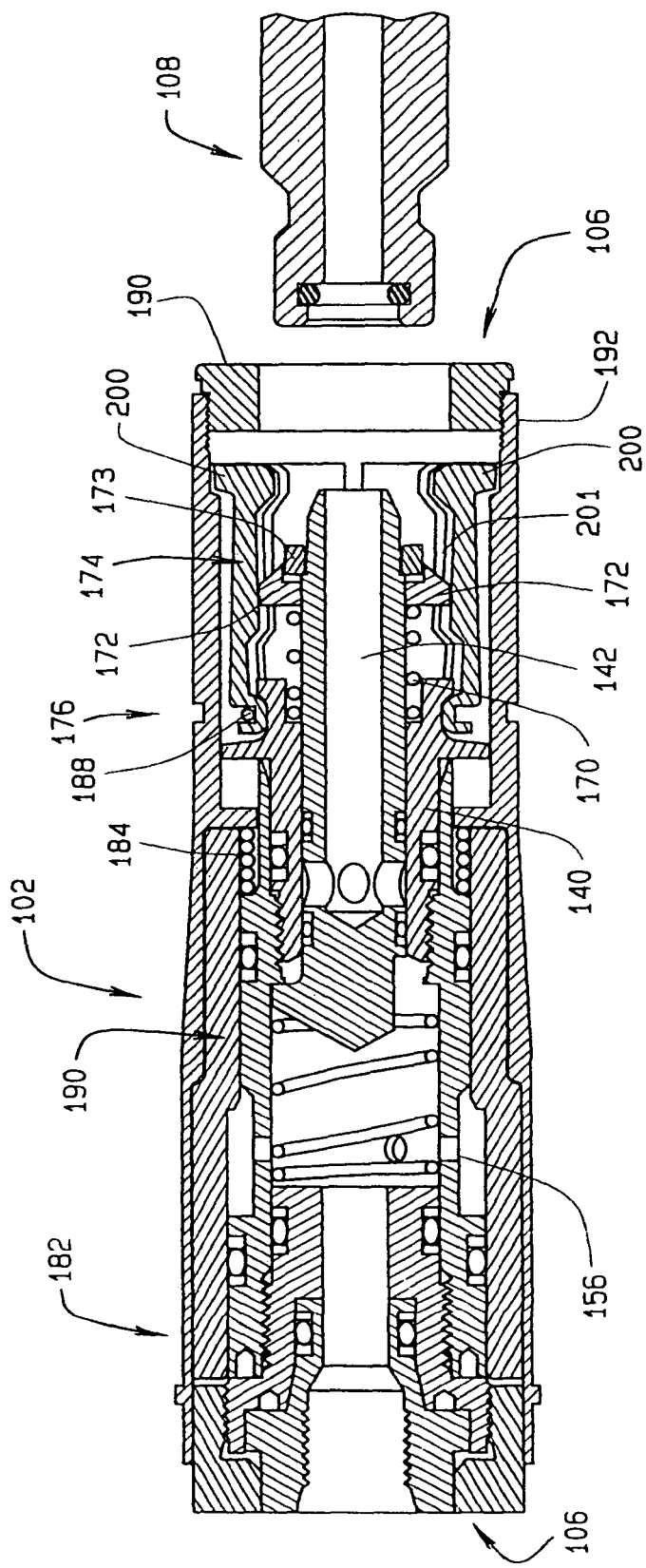
FIG. 5 is a cross-sectional side view of such embodiment, similar to FIG. 4, but also showing a connector of an outlet receptacle prior to insertion thereof into the outlet end of the embodiment.

FIG. 5 shows, in a side sectional view, the typical condition of the tubular nozzle construction 102 before a connector 108 of an outlet receptacle is coupled to the nozzle. Before the connector 108 is inserted into the distal end 106 of the nozzle, outer sleeve 182 and inner sleeve 180 are each held in their rearmost positions against the force of spring 184 due to the open positions of the jaws 174, and outlet tube 142 is biased towards the distal end 106 by spring 156.

Figure 6:
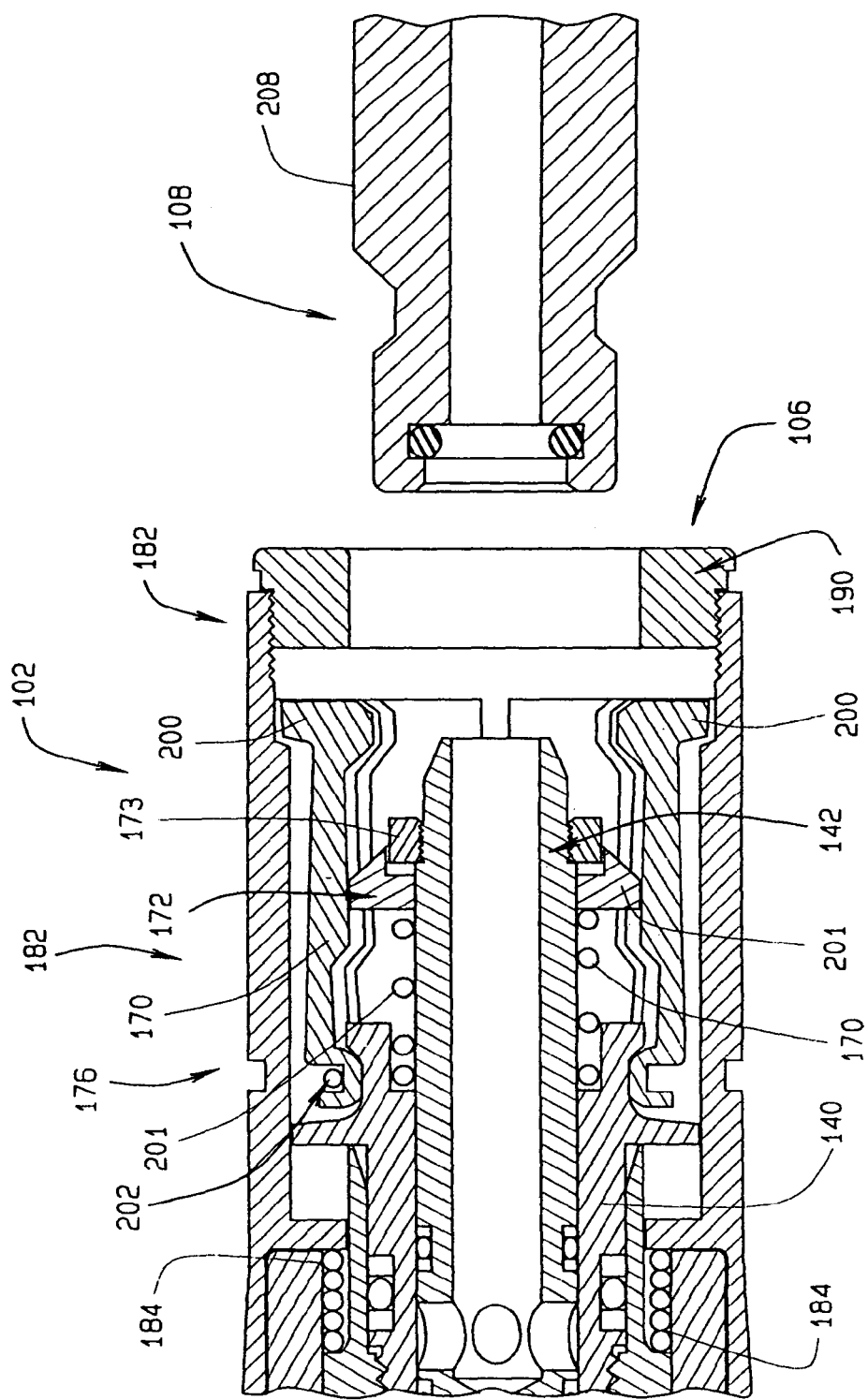
FIG. 6 is an enlarged partial cross-sectional side view of such embodiment, similar to FIG. 5, but better showing various internal components.

FIG. 6 shows, in an expanded, partial, side sectional view, the forward portion of the tubular nozzle construction before it is coupled to the connector 108 of the receptacle, better showing certain details of various components of the tubular nozzle construction 102 at such time. As can be observed from such figure, the steps 200 at the distal ends of jaws 174 interfere with the forward tendency of the jaw lock cylinder 176 of outer sleeve 182, thus causing outer sleeve 182 to remain in its rearward position despite the forward force exerted by spring 184. The jaws 174, of which there are preferably six, are held in such open position by the annular outlet ring 172 on outlet tube 142. The annular outlet ring 172 is held in place against outlet tube end cap 173, which is threaded on to outlet tube 142, by outlet tube spring 170, and outlet ring 172 acts against the inner sides 201 of jaws 174 to hold their distal ends open, while jaw spring 188 holds jaws 174 together in their radial pattern. Nozzle endpiece 190 serves to prevent connectors and receptacles rated for lower pressure than this nozzle from entering the fueling orientation described below. Bumper 192 prevents jarring, marking, or denting between the nozzle and the vehicle being fueled and longitudinal grooves in outer sleeve 182 prevent rotation of outlet collar 140.

Figure 7:
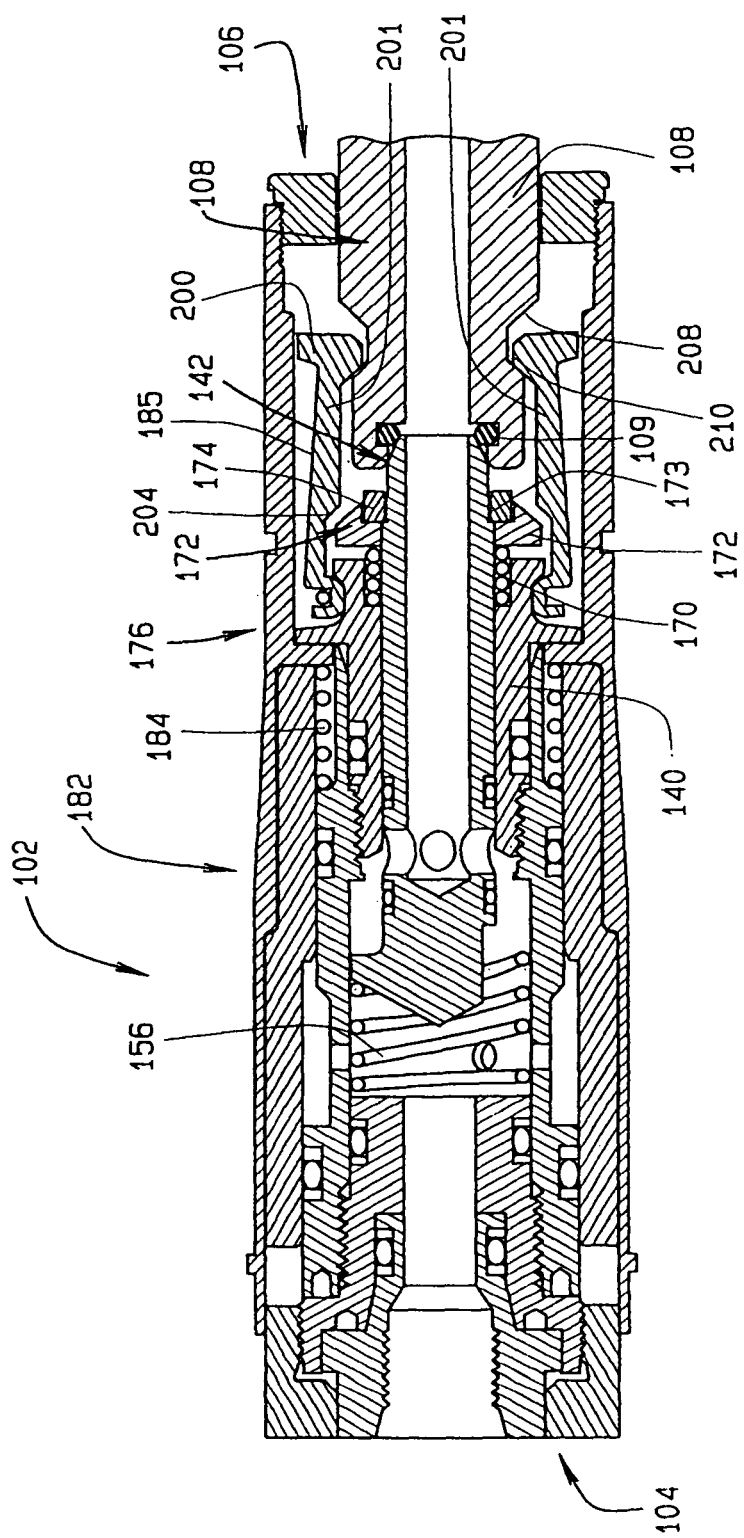
FIG. 7 is a further cross-sectional side view showing the embodiment after it has been fully engaged with the connector but before the embodiment has been pressurized via an external valve.

FIG. 7 shows, in a side sectional view, the tubular nozzle construction 102 after it has been fully engaged by the connector 108 of the outlet receptacle, but before the tubular nozzle construction 102 has been pressurized via the external ball valve. Due to the action by the user in pushing the nozzle body on to connector 108, outlet tube 142 has moved rearwardly, against the force of central spring 156, towards the proximal end 104 of the nozzle construction 102. This rearward movement also moves outlet ring 172 and outlet tube end cap 173 the same amount, compressing outlet tube spring 170, as well as central spring 156, causing outlet ring 172 to move along the inner sides 201 of jaws 174 and into recesses 204 near the proximal ends of jaws 174. It should be noted that the fluid passage formed by the engagement of outlet tube 142 with connector 108 is sealed by the O-ring 109 contained inside the connector 108.

Due to such movement, the jaws 174 then no longer have outlet ring 172 restricting their radially inward clamping motion at the distal ends thereof. At the same time, outer sleeve spring 184 is relieved due to the inner sides 201 of the jaws 184 no longer being held radially outwardly such that steps 200 of the jaws 174 impede forward motion towards distal end 106 of the nozzle construction 102 of jaw lock cylinder 176, and hence the outer sleeve 182, as was the case in FIG. 6. Outer sleeve 182 therefore is pushed forward, pushing the distal ends of fingers 185 of jaws 174 radially inwardly to clamp connector 108 of the outlet receptacle in a locked, fueling configuration, position via the engagement of the annular groove 208 along the connector. 108 with forward lock projections 210 at the distal ends of jaws 174.

Figure 8:
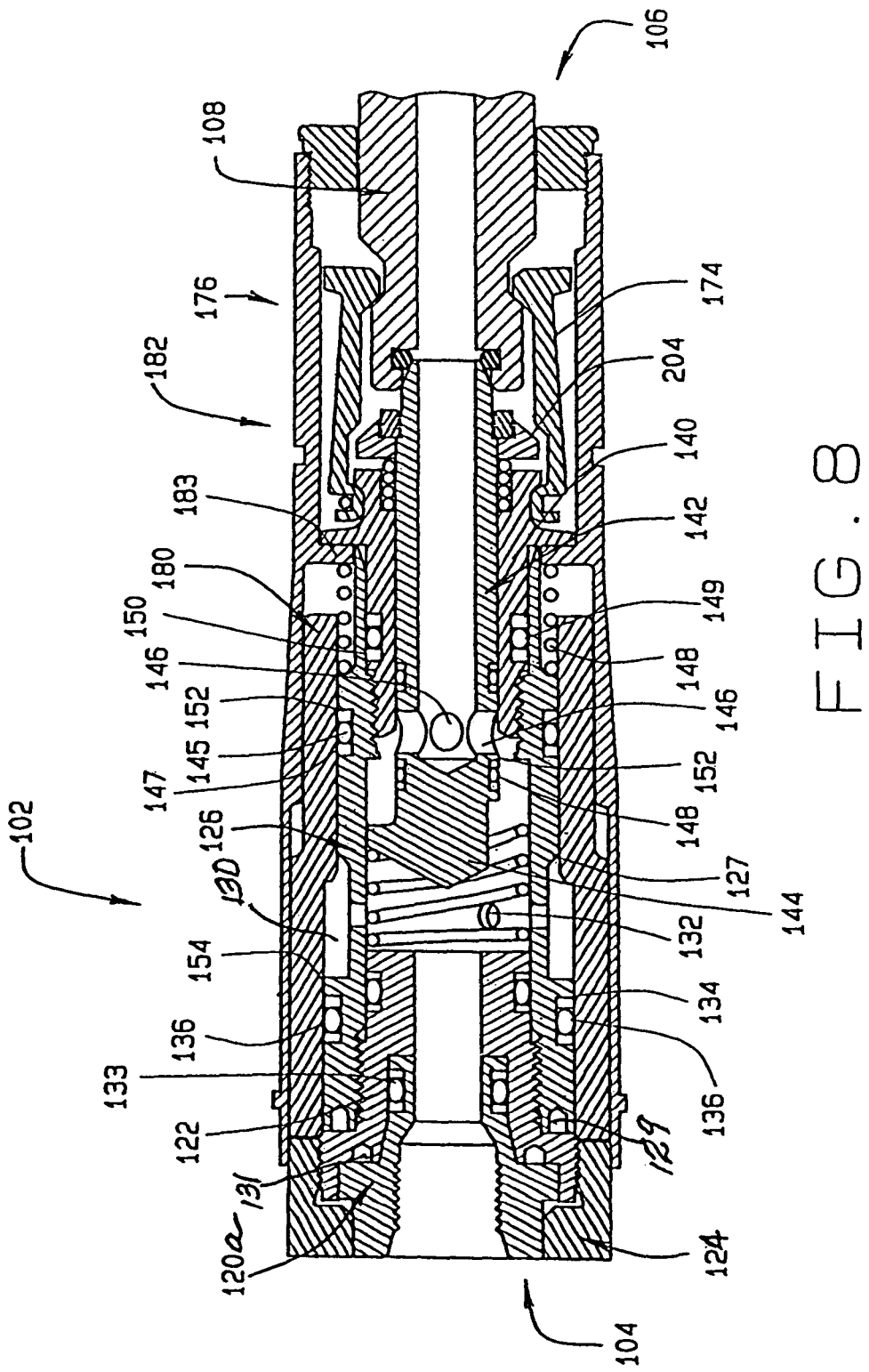
FIG. 8 is a further cross-sectional side view showing the embodiment after it has been fully pressurized by the introduction of pressurized fluid thereinto.

FIG. 8 then shows, in a side sectional view, the tubular nozzle construction 102 after it has been pressurized, such as by operation of the external ball valve associated with the inlet reserve, which is the condition of the mechanism when fuel is flowing. Fuel flows in through inlet fitting 120, which in turn is held on by nut 124. Inlet fitting 120a is allowed to rotate 360 degrees in the cavity created when nut 124 is threaded on to inlet cap 122. O-ring 131 and backup rings 129 seal the interface between inlet fitting 120 and inlet cap 122. O-ring 133 and backup rings 135 seal the interface between inlet cap 122 and central cylinder 126. The fuel enters the fuel chamber 127 inside the fuel conveyance of central cylinder 126.

Holes or apertures 132 in the side of central cylinder 126 allow the fuel to also flow therethrough from fuel chamber 127 to fill the annular outer pressure chamber 130 between it and inner sleeve 180. The difference in diameter between the front and rear sealing surfaces of inner sleeve 180, with the front diameter being smaller, allow the pressurized gaseous fuel to push the generally cylindrical inner sleeve 180 forwardly against the protruding, interiorly extending step or wall 183 of jaw lock cylinder 176.

At high pressure, the forward force of inner sleeve 180 against jaw lock cylinder 176, and hence against outer sleeve 182, of which jaw lock cylinder 176 is a part, is high enough to prevent the user from being able to easily pull the outer sleeve 182 rearwardly to disconnect the nozzle construction 102. For a user to be able to do so, the pressure must first be vented, thus ensuring a safe disconnection. Inner sleeve 180 is sealed against the fuel conveyance of central cylinder 126 by means of O-rings and backup rings such as 134, 136, 145, and 147.

Fuel is also allowed to flow from fuel chamber 127 into the holes or apertures 146 in the rear portion of outlet tube 142, near capped end 144, due to the rearward movement of the outlet tube 142 to position such holes outside the bore formed by outlet collar 140. Fuel then flows from fuel chamber 127 through the holes or apertures 146 and into and through outlet tube 142, to the connector 108 of the outlet receptacle, and into the vehicular fuel tank. The piston formed by outlet tube 142 is sealed against outlet collar 140 by O-rings and backup rings such as 148 and 152.

It should be appreciated that the rearward set of such O-rings and backup rings seal the flow of fuel into the outlet tube 142 only when outlet tube 142 is in a closed, or forward, position, as shown in FIG. 5, and not when outlet tube 142 is in an open, or rearward, position, as shown in FIGS. 7 and 8. The interface between outlet collar 140 and the central fuel conveyance cylinder 180 is sealed via O-ring and backup rings such as 149 and 150 in both instances.

Figure 9:
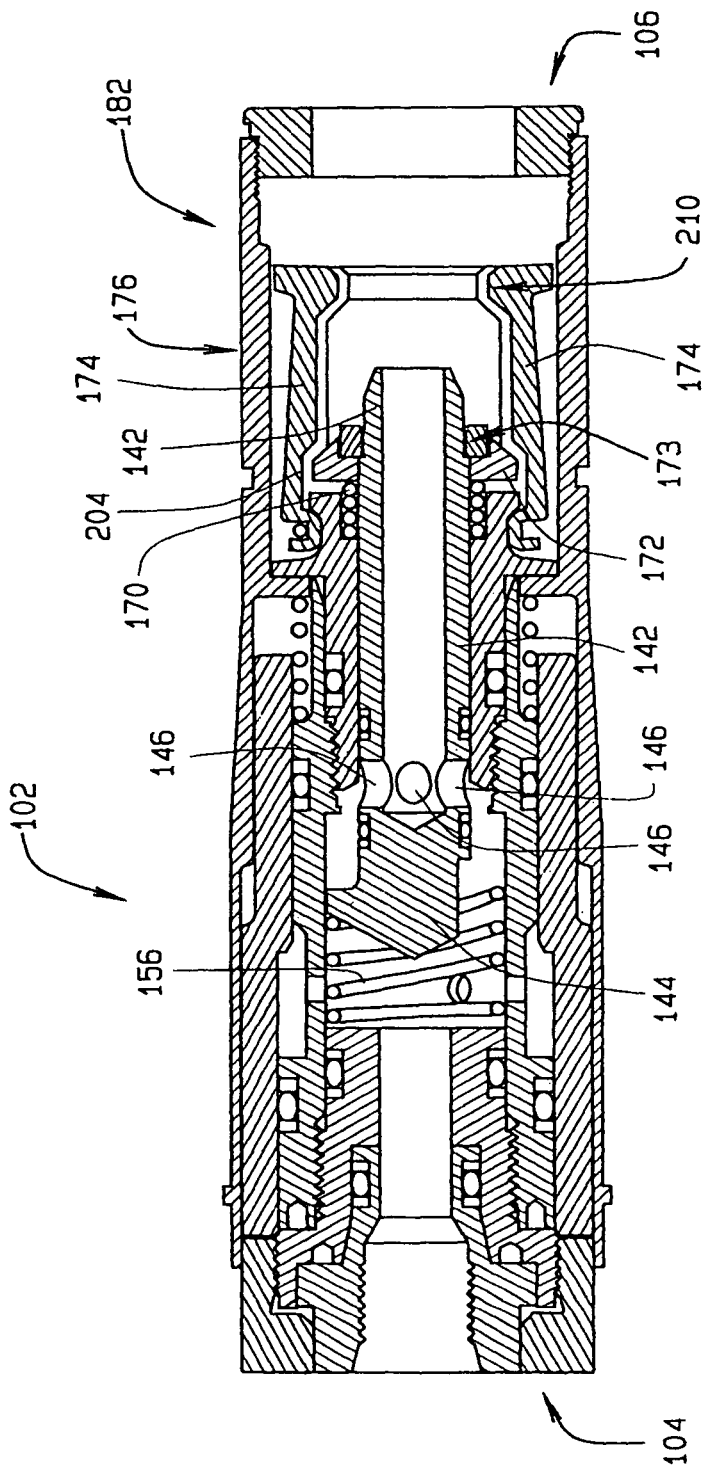
FIG. 9 is a cross-sectional side view showing the embodiment in a situation where the outlet tube has been compressed by a force other than a correct connector; and, FIG. 10 is a cross-sectional side view showing the embodiment in a situation where the outlet tube was compressed by a force other than a correct connector and the embodiment was thereafter pressurized.

FIG. 9, in a side sectional view, shows the nozzle construction 102 in the event that outlet tube 142 is depressed, or caused to move rearwardly towards the proximal end 104 of nozzle 102, by an external force other than a proper and correct connector of the outlet receptacle. In such event, outlet tube 142, with annular outlet ring 172 and end cap 173 thereon, moves rearwardly, with central spring 156 and outlet tube spring 170 being compressed, while jaw lock cylinder 176 and outer sleeve 182 move forwardly and jaws 174 clamp inwardly in the same manner as they would if a proper and correct connector of the outlet receptacle had actually been inserted into the distal end 106 of the nozzle construction 102 against the outlet ring construction 172 of outlet tube 142. As this occurs, annular outlet ring 172 becomes constrained within recesses 204 of jaws 174. However, since a proper and correct connector is not actually present, central spring 156 continues to push forwardly against outlet tube 142 and its capped end 144, thus pushing outlet tube 142 and threaded outlet tube cap 173 thereon forwardly again, adjacent to the interior surfaces of jaws 174, while annular outlet ring 172, which is slideable on outlet tube 142, remains constrained within recesses 204 of jaws 174, then resulting in the orientation seen in FIG. 10.

Figure 10:
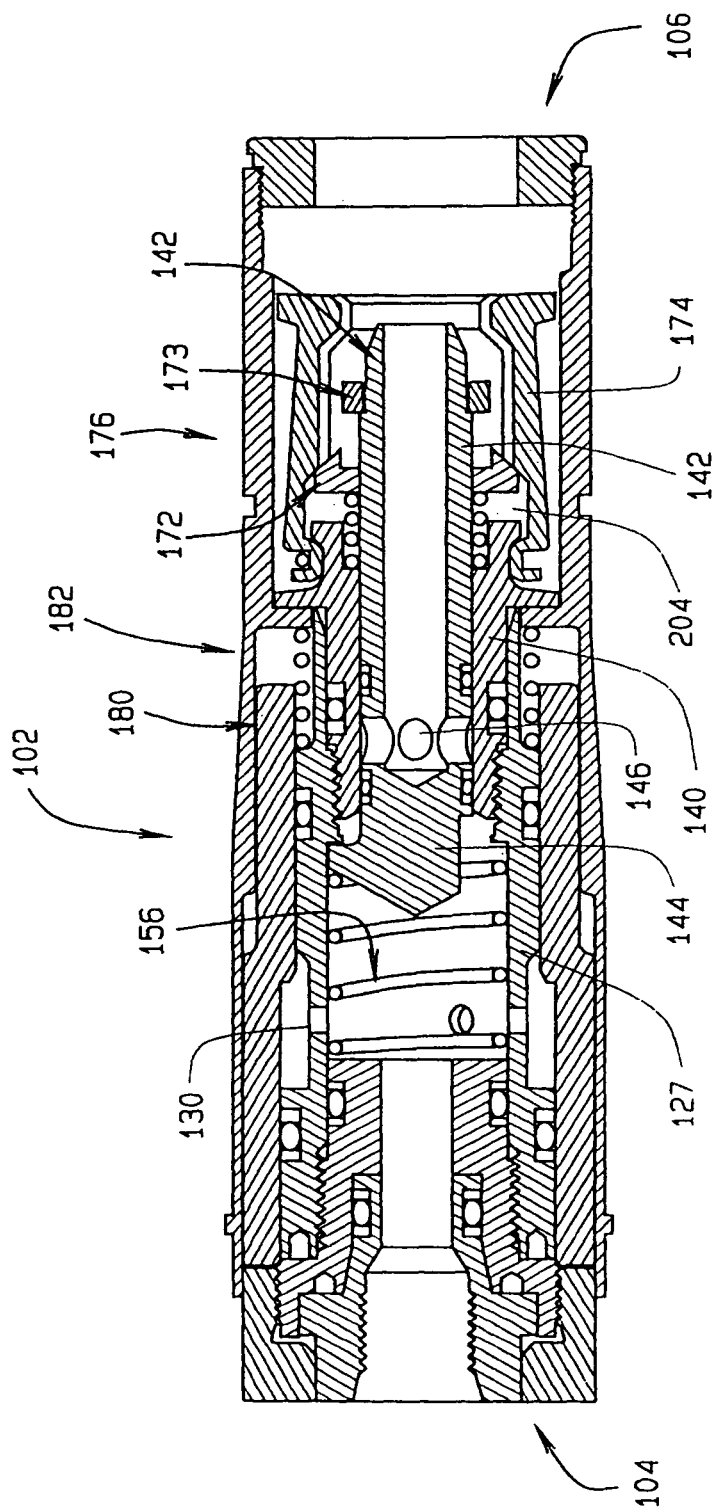

FIG. 10 shows, in a side sectional view, the nozzle construction 102 after outlet tube 142 has been depressed by an external force other than a proper and correct connector of the outlet receptacle, and as such outlet tube 142 has then been immediately pushed back forwardly by central spring 156, while outlet ring 172 remains in a rearward position on outlet tube 142 due to the clamped position of jaws 174. Any remaining force causing outlet tube 142 and its associated threaded outlet tube cap 173 to tend rearwardly is overcome as soon as pressure is introduced into the nozzle construction 102, and the forward movement of outlet tube 142, and resultant closure of apertures 146, acts to seal off the flow of fuel to the outside world. Under pressure from the fuel that flows from fuel chamber 127 to outer chamber 130, inner sleeve 180 will move into its forward position.

Return of the nozzle construction 102 to its open or non-fueling orientation, as shown in FIG. 5, is accomplished by venting via the external valve, if required, and by the user then pulling rearwardly on outer sleeve 182. As the distal ends of the jaws 174 move radially outwardly outlet ring 172 is allowed to escape recesses 204 on jaws 174 and is pushed back forwardly on outlet tube 142 towards and adjacent to end cap 173 by spring 170, with jaws 174 returning to their open positions.

In light of all the foregoing, it should thus be apparent to those skilled in the art that there has been shown and described an improved high pressure filling nozzle for dispensing pressurized gaseous fluids from an inlet reserve to an outlet receptacle. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

I claim:

1. A high pressure dispensing nozzle for providing fuel from an inlet reserve to a connector of an outlet receptacle, comprising:
    a tubular formed construction having:
    a first, proximal, inlet end,
    a second, distal, outlet end,
    an outer sleeve extending from adjacent said proximal inlet end towards said distal outlet end,
    an internal construction disposed within said outer sleeve, and
    a plurality of radially movable jaw members disposed between said internal construction and said outer sleeve, and said jaw members extending to proximate said distal end of said tubular construction,
    said movable jaw members always remain interiorly of said tubular construction within said outer sleeve during both fueling and non-fueling operations of said dispensing nozzle to shield said jaw members from impacting any extraneous means and to prevent any damage thereto,
    said distal end of said tubular construction having an opening therethrough sized to accommodate the insertion of the connector of the outlet receptacle, said internal construction secured to said proximal end of said tubular construction and having:

an entryway connectable to the inlet reserve, and a fuel chamber with a proximal end and a distal end, said proximal end of said fuel chamber being in communication with said entryway, an outlet tube having:

a first, proximal, capped end extending into said distal end of said fuel chamber, a second, distal, open end spaced inwardly from said distal end of said tubular construction, a tubular wall extending between said capped end and said open end forming an internal channel therealong, at least one radial aperture in said tubular wall proximate said capped end, and forwardly of said capped end of the tubular end, an inwardly-tapered distal end configured to be sealingly matably engageable with the connector of the outlet receptacle, an annularly projecting outlet ring positioned for limited movement on said outlet tube proximate said distal end thereof and configured to be in riding contact internally of said jaw members, said outlet tube operatively associated within said tubular construction to function as a valve to allow for and restrict flow of fuel through said aperture between said entryway and said internal channel and as a control for regulating the clamping operation by said jaw members, said outlet tube being normally biased toward said distal end of said tubular construction to restrict free communication between said entryway and said internal channel, and to maintain its radial aperture of said outlet tube in closure, said outlet tube being slideably movable to move said capped end of said outlet tube rearwardly and forwardly in said fuel chamber to open and close said radial aperture in response to the amount of compressible force being exerted against said outlet tube, said outlet tube moving to open said radial aperture upon the exertion of a compressible force by the connector of the outlet receptacle against said outlet tube sufficient to overcome said normal biasing, and moving to close said aperture by the removal of said compressible force against said outlet tube, said internal construction including a fixed outlet collar, said outlet collar supporting the inner ends of said jaw members, an annular disposed spring securing the inner ends of the jaw members for limited pivotal movement relative to said outlet collar, a conveyance cylinder, said conveyance cylinder extending rearwardly from said outlet collar and rigidly secured thereto, an inlet cap, said inlet cap extending rearwardly from said conveyance cylinder and connected thereto, and a nut applied at the inlet end of the tubular formed construction and further secured to said inlet cap, said jaw members having:

inner ends positioned along said annular wall of said outlet tube, outer ends positioned inwardly of said distal end of said tubular construction of said outlet tube, and fingers extending between said inner and outer ends with interior sides of said fingers in riding contact upon said annular outlet ring positioned for limited movement upon said outlet tube, movement of said outlet tube to move said capped end of said outlet tube rearwardly also effecting movement of said outlet ring along said interior sides of said fingers of said jaw members, said fingers being configured to effect pivotal radial movement of said outer ends of said jaw members towards and away from one another as said outlet ring on said outlet tube is moved by the movement of said outlet tube between a fueling position with said radial aperture open and a non-fueling position with said radial aperture closed within said outlet collar, said outer ends of said jaw members being configured to clampingly engage the connector of the outlet receptacle to clamp the connector in compressible engagement with said outlet tube when said outer ends of said jaw members are moved radially towards one another, and to release the clampingly engaged connector when said outer ends of said jaw members are pivotally moved radially away from one another, said outlet ring and said jaw members being cooperatively engageable at actuation positions along said fingers when said outlet tube is inserted at said fueling position to effect said clampable engagement, said dispensing nozzle including an inlet fitting, said inlet fitting being secured by said nut to the inlet end of said tubular formed construction, and said inlet fitting provided fully within the high pressure dispensing nozzle, capable of rotating in its connection with the tubular form construction to provide the ability of said dispensing nozzle to swivel relative to the inlet reserve during usage, and whereby the outlet tube is slideably movable relative to said outer sleeve to function to effect clamping action by said jaw members upon the outlet receptacle and as a valve to provide for passage of fuel from the inlet reserve through said internal construction to the connector of the outlet receptacle.

2. The dispensing nozzle of claim 1 wherein said internal construction includes:

a central fuel cylinder within which said fuel chamber is formed and an outer chamber external to said central fuel cylinder and formed by said central fuel cylinder and a slideably movable inner sleeve, with said outer chamber being in communication with said fuel chamber, and wherein, said outer sleeve is so engaged with said inner sleeve to be affected by slideable movement of said inner sleeve upon pressurization and de-pressurization of said outer chamber, introduction of pressurized fuel from said fuel chamber into said outer chamber pressurizing said outer chamber and effecting slideable movement of said outlet tube against said outer tube from a first position to a second position to effect a responsive movement of said outer tube from a home position towards said distal end of said generally tubular construction to a fueling condition, said slideable movement of said outer tube locking said jaw members in place in clamping engagement with the connector of the outlet reserve to maintain said clamping engagement, removal of pressurization of said outer chamber de-pressurizing said outer chamber and permitting manual slideable movement of said outer sleeve by a user from said fueling condition back towards said proximal end of said generally tubular construction to said home position and a corresponding slideable movement by said inner sleeve from said second position to said first position, and whereby introduction of pressurized fuel into the fuel chamber when the connector of the outlet reserve is in intimate engagement with said outlet tube pressure locks said nozzle in a fueling configuration.

3. The dispensing nozzle of claim 2 wherein:

said outlet tube is also moveable upon the exertion of a non-maintained compressible force against said outlet tube sufficient to overcome said normal biasing, to effect movement of said proximal capped end of said outlet tube into said fuel chamber, to effect positioning of said outlet ring and said fingers of said jaw members in said actuation position to thereby effect radial movement of said outer ends of said jaw members towards one another as said outer tube is moved, and to effect slideable movement of said outer tube to lock said jaws in place, said outlet ring is slideably moveable between forward and rearward positions upon and along said outlet tube, with said outlet ring being normally biased to said forward position on said outlet tube, and wherein, when such an exerted compressible force is not maintained against said outlet tube, said normal biasing of said outlet tube, coupled with the pressure exerted upon said capped proximal end of said outlet tube when pressurized fuel is introduced into said fuel chamber, effects slidable movement of said outlet tube towards said distal end of said generally tubular construction while said outlet ring is maintained in said actuation position relative to said fingers of said jaw members and thereby effects movement of said outlet ring with said outlet tube as said outlet tube is moved, and said slideable movement of said outlet tube towards said distal end of said generally tubular construction ensures that said aperture in said outlet tube is closed to prevent the free flow of fuel therethrough, whereby the discharge of fuel from said dispensing nozzle is safely prevented when a connector of an outlet receptacle is not properly engaged with said nozzle.

* * * * *